United States Patent

[11] 3,593,011

| [72] | Inventors | John O. Beauxis, Jr.;<br>Ronald C. Kowalski, both of Baytown, Tex. |
|---|---|---|
| [21] | Appl. No. | 728,004 |
| [22] | Filed | May 9, 1968 |
| [45] | Patented | July 13, 1971 |
| [73] | Assignee | Esso Research and Engineering Company |

[54] ANALOGUE CONTROL DEVICE FOR CHEMICAL PROCESSES
7 Claims, 2 Drawing Figs.

[52] U.S. Cl.......................................................... 235/151.1, 235/151.12
[51] Int. Cl........................................................ G06g 7/58
[50] Field of Search........................................... 235/150.1, 151.12, 151.13, 151.1, 151

[56] References Cited
UNITED STATES PATENTS

| 2,842,311 | 7/1958 | Petrie............................ | 235/151.1 X |
| 2,874,906 | 2/1959 | Nossen......................... | 235/151.1 X |
| 2,922,475 | 1/1960 | Alexander.................... | 235/151.1 UX |
| 3,015,129 | 1/1962 | Hays et al..................... | 235/151.1 X |
| 3,183,950 | 6/1964 | Welty et al................... | 235/151.12 UX |

*Primary Examiner*—Malcolm A. Morrison
*Assistant Examiner*—Joseph F. Ruggiero
*Attorneys*—Thomas B. McCulloch, Melvin F. Fincke, John S. Schneider, Sylvester W. Brock, Jr., Kurt S. Myers and Timothy L. Burgess ABSTRACT: A simple analogue control device for controlling chemical processes comprises a primary interfacing circuit, and analogue computer circuit, a memory-controller, and a process control circuit. The memory-controller circuit in its most specific aspect comprises a recorder-controller, a storage device which stores the output voltage from the recorder-controller, a switch between the recorder-controller and the storage device, and a timer circuit which sequentially opens the switch between the recorder-controller in the storage device, actuates the pen motor of the recorder-controller to allow the pen to take a new position in response to the input voltage signal into the recorder-controller, deactivates the motor establishing a new output voltage proportional to the input voltage signal and closes the switch to store the new output voltage.

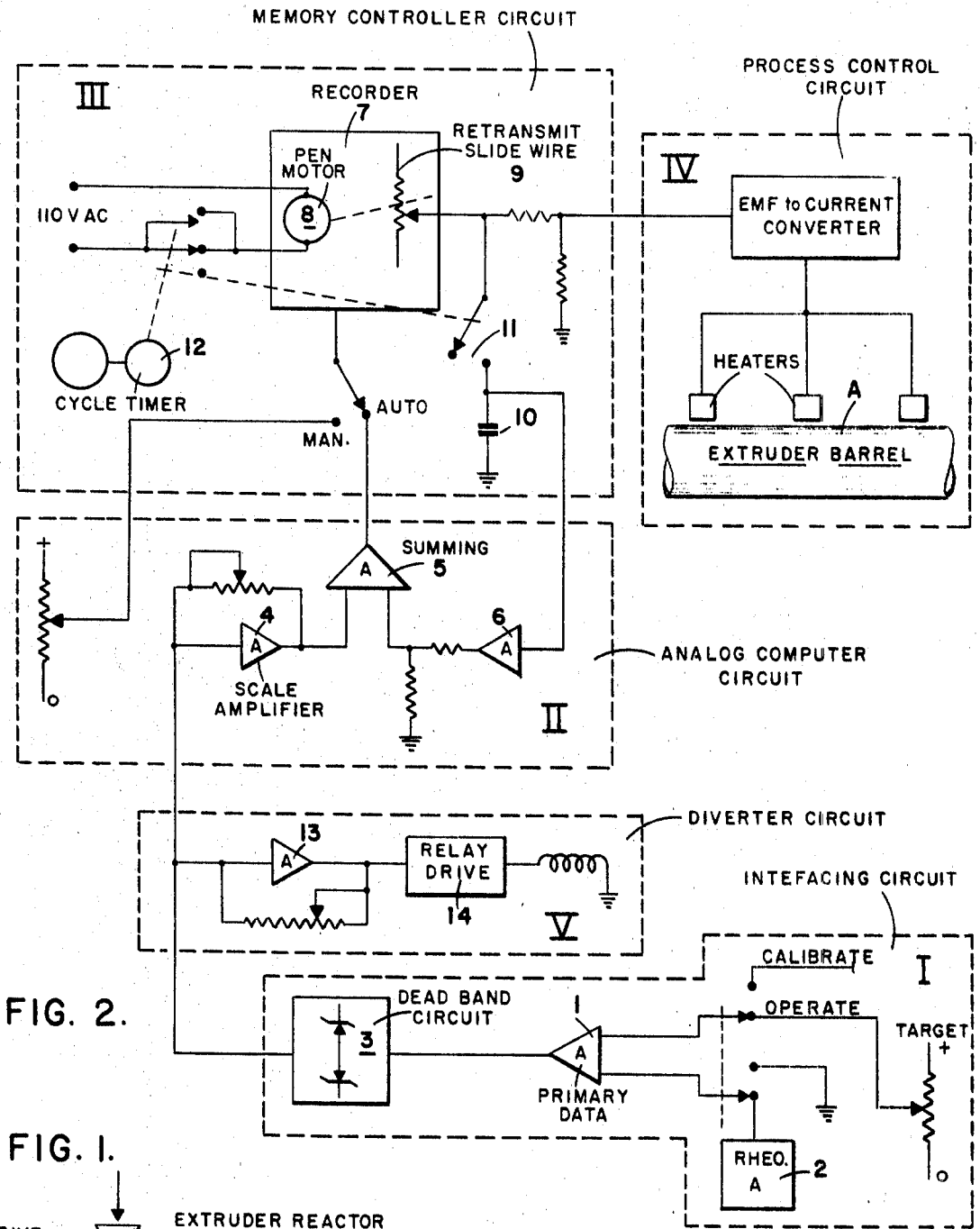
FIG. 2.
FIG. 1.
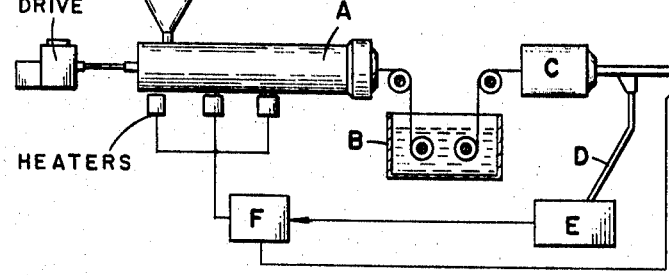
INVENTORS.
JOHN O. BEAUXIS, JR.,
RONALD C. KOWALSKI,
BY
ATTORNEY.

ANALOGUE CONTROL DEVICE FOR CHEMICAL PROCESSES

BACKGROUND OF THE INVENTION

In many chemical processes, there is a need for a simple and inexpensive device which will automatically control the process on the basis of a measured characteristic or parameter in the product. Most automatic controllers which are used have the disadvantage that there is an almost constant variation in the controllable parameters of the process in continuous operation, and the process is not allowed time to line out before corrections are made to the process conditions. Also, in contrast to the automatic controller systems of the prior art which depend on a fixed relationship between the process variables or parameters and the measured parameters, the present invention is independent of any such fixed relationship and requires only that the relationship be directionally positive or negative. The control device of the present invention provides a simple system to directionally change the process variable in relation to a measured parameter of the product at a specific time in the process such that the degree and the direction of change is made to achieve an optimum value of the measured parameter.

SUMMARY OF THE INVENTION

The present invention may be briefly described as a simple analogue control device which comprises a primary interfacing circuit which extracts the significant errors in the product being controlled by the control device and converts a significant error into an input signal compatible with the remainder of the system, an analogue computer circuit which continuously computes a correctional process set point, a memory-controller circuit which stores the process set point for a period of time and periodically changes the set point in response to the signal from the analogue computer circuit, and a process control circuit which utilizes the set point for controlling the process as desired.

BRIEF DESCRIPTION OF THE DRAWINGS

FIG. 1 discloses a schematic of the control system used in controlling the processing of polypropylene; and FIG. 2 is an electrical diagram of the preferred embodiment of the control system of the present invention.

DESCRIPTION OF THE PREFERRED EMBODIMENT

Referring to the drawings, FIG. 1 schematically shows the processing of polypropylene to produce polypropylene of a desired molecular weight. It has been found that by controlling the conditions in an extruder-reactor that the molecular weight of the polypropylene can be controlled. In the specific environment in which the control system of the present invention is illustrated, polypropylene is introduced into an extruder-reactor A and passed through at controlled conditions, for example, at a controlled temperature. The extruded polypropylene passes through a water bath B to a pelletizer C. A sample of pelletized polypropylene is taken by line D to a continuous rheometer E. The rheometer E is an instrument which measures the melt viscosity of the polypropylene at a given temperature (for example, 450° F.) through an orifice of known geometry and under a constant pressure. The melt viscosity is a function of molecular weight. In the environment in which the present invention is illustrated, the melt viscosity is the parameter measured to control the production of the desired product from the extruder-reactor utilizing the control system of the present invention.

In the specific embodiment, the parameter which is measured is the melt viscosity or molecular weight of the polypropylene as measured in the continuous rheometer E, and the parameter which is controlled is the temperature condition in the extruder-reactor A. The input of the electrical circuits of the control system of the present invention in the specific embodiment is a voltage which is proportional to the melt viscosity obtained by a pressure-drop measurement whereas the output is a voltage which is converted to a proportional current which is used to adjust the set points on temperature controllers or pressure or other controller controlling the reaction in the extruder-reactor A. It is to be understood, however, that the particular input and output signals for the control system of the present invention are not limited to those illustrated in the specific embodiment but depend on the parameters being measured or controlled in the particular process in which the control system of the present invention is used. Thus, whether these input and output signals are electrical, pneumatic or controlled by other type equipment is immaterial to the present invention. The converting devices which are used to obtain the electrical signals, as well as any other type converting devices, are well known and form no part of the present invention.

The present invention is directed to a simple analogue control device for controlling chemical processes which comprises a primary interfacing circuit (I), an analogue computer circuit (II), a memory-controller circuit (III), and a process control circuit (IV). The schematic circuit diagram of the control system of the present invention is shown in FIG. 2 with each of the foregoing components of the control device enclosed in dashed lines. It is to be understood, however, that the primary interfacing circuit and process control circuit illustrated in FIG. 2 are preferred embodiments; and while serving a definite function in the simple analogue device for controlling the molecular weight of polypropylene, for example, these circuits and especially the process control circuit may be quite different depending on the chemical process and parameters being measured and controlled. In the embodiment illustrated in FIG. 2, the output voltage from the memory-controller circuit (III) is converted in the process control circuit (IV) to current and fed to a heater to control temperature. On the other hand, the output voltage from the memory-controller circuit may be converted in another specific process control circuit to pressure which actuates a valve to control flow or pressure in the process, or to other controlling parameters of the process.

As shown in FIG. 2, a target voltage is established as one input to a primary data amplifier 1. The target voltage is a fixed voltage which would establish the control parameter of the process at a desired point to obtain the desired product. A second input signal is obtained from the rheometer amplifier 2 of the rheometer E. This input signal is proportional to the melt viscosity of the polypropylene measured in the rheometer E at any instant. The voltage from the primary data amplifier 1 is equal to the target voltage plus or minus the voltage from the rheometer amplifier 2 times a constant which is the gain in the primary data amplifier 1. The signal is introduced into a dead band circuit 3 which is preferably a circuit containing two Zener diodes in back-to-back configuration. The dead band circuit 3 is introduced to scale amplifier 4 which after proper scale amplification is introduced to a summing amplifier 5. The summing amplifier 5 receives an input signal from the scale amplifier 4 continuously and periodically from a capacitor amplifier 6 which obtains a signal from the memory-controller circuit (III). The scale amplifier 4, capacitor amplifier 6 and the summing amplifier 5 comprise the analogue computer circuit (II) of the present invention.

The signal from the analogue computer circuit (II) is introduced to a memory-controller circuit (III). In the preferred embodiment, the signal from the summing amplifier 5 is introduced into a recorder-controller 7. The recorder-controller 7 has a pen motor 8 which not only controls the position of the pen of the recorder but also positions the slide on a retransmit slide wire 9 of the controller. The position of the slide on the retransmit wire 9 fixes the output voltage from the recorder-controller 7 proportional to the slide wire position. A constant voltage output is established when the slide on the slide wire is stationary. The memory-controller circuit (III) also comprises a memory capacitor bank 10 which is capable of storing the output voltage from the recorder-controller 7. A switch 11 is in the line between the recorder-controller 7 and the memory capacitor bank or storage device 10. A timer circuit 12 is connected to the power lines of the pen motor 8 and to the switch 11 so that it can sequentially open switch 11, supply power to the pen motor for a short period of time, cut off the power to the pen motor 8 and thereafter close switch 11.

The operation of the combination of the analogue computer circuit (II) and memory-controller circuit (III) provides a simple control device such that the recorder-controller 7 serves as a memory-controller device. When the power to the pen motor 8 of the recorder-controller 7 is turned off the device functions as a memory device. During that time the recorder-controller 7 has a constant output voltage and this voltage is stored in the storage device 10. Periodically, the pen motor 8 is turned on and the recorder-controller 7 functions as a controller changing the position of the pen and the slide on the retransmit wire 9 in response to any change in the output of the analogue computer circuit (II). Accordingly, if a significant difference exists between the target voltage and voltage from the measured parameter, a new set point is fixed for the control of the process. If the measured parameter is within the dead band, no input signal is obtained and the signal from the analogue computer circuit (II) is the same as in the previous operation causing no change in the position in the slide wire of the recorder-controller 7. The timer circuit 12 of the memory-controller (III) controls the time periods at which the difference between the measured parameter and target voltage will have an effect on making changes in the control parameter of the process. Depending on the process being controlled, this may be a few minutes or a few hours. The control of switch 11 ensures that the memory-controller device or recorder-controller 7 functions only as a controller when the output of the analogue computer circuit (II) is making a change in the memory-controller set point. For that period the memory function is in the storage device 10. This time period may be measured in milliseconds or seconds.

Other modifications to the control device of the present invention may also be made. For example, a diverter circuit (V) may be a part of the control device so as to divert off-specification material. Referring to FIG. 1, a diverter valve G may be in the outlet stream which is controlled by diverter circuit (V). The diverter circuit (V) comprises a specification bandwidth circuit 13 wherein if the voltage output through the dead band circuit 3 is in excess of a predetermined amount set in the bandwidth circuit 13 the relay drive 14 will be activated such that the diverted valve G will be changed in position so that the product will be fed to another line. Thus, when the control parameter gives a signal which indicates a substantial off-specification operation, the product may be diverted and not mixed with on-specification product.

While a recorder-controller is illustrated as the memory-controller device in the specific embodiment, it is to be understood that a device capable of having a continuous output voltage proportional to a noncontinuous input voltage signal may be used. For example, a peak reading volt meter could be used but would not have the advantage of the recording function of the recorder-controller. However, it should not be overlooked that a device which will maintain a record of the operation is highly advantageous.

The nature and objects of the present invention having been completely described and illustrated, what we wish to claim as new and useful and secure by Letters Patent is:

1. A control device which comprises:
a memory-controller circuit comprising
a recorder-controller with a pen motor and retransmit wire, the position of the retransmit wire providing an output voltage proportional to a noncontinuous input voltage signal, the output voltage remaining constant for a specified period of time; a storage device which stores the output voltage from said recorder-controller during the time period when said noncontinuous input voltage signal is received by said recorder-controller; a switch between said recorder-controller and said storage device; and a timer circuit which sequentially opens said switch to activate the pen motor of said recorder-controller which responds to the input voltage signal and positions the retransmit wire and thereafter deactivates said pen motor establishing a new output voltage; and closes said switch to store the new output voltage in said storage device.

2. A control device which comprises:
a primary interfacing circuit;
an analogue computer circuit which continuously computes a correctional set point; and
a memory-controller circuit which comprises a recorder-controller which includes means for providing a continuous output voltage proportional to a noncontinuous input voltage signal, the output voltage remaining constant for a specified period of time; a storage device which stores the output voltage from said recorder-controller during the time period when said noncontinuous voltage signal is received by said recorder-controller from said analogue computer circuit; a switch between said recorder-controller and said storage device; and a timer circuit which sequentially opens said switch, activates said recorder-controller to allow a new input voltage signal into said recorder-controller, deactivates said recorder-controller, and closes said switch whereby the newly established output voltage is stored in said storage device.

3. A control device according to claim 2 wherein said analogue computer circuit comprises a summing amplifier which sums the voltage signal from a scale amplifier which receives a signal from said primary interfacing circuit and the voltage signal from a capacitor amplifier which receives a signal from said storage device to produce said input voltage signal for said recorder-controller, 4. A control device according to claim 3 wherein said recorder-controller has a pen motor and retransmit wire and said timer circuit after opening said switch activates said pen motor which responds to said input voltage signal from said analogue computer circuit to position the pen and slide on said retransmit wire.

5. A control device according to claim 4 which further includes a process control circuit.

6. A control device according to claim 5 wherein said process control circuit comprises a converter device to convert the output voltage from said memory-controller circuit to current which is fed to heaters for control of temperature.

7. A control device according to claim 4 wherein said primary interfacing circuit contains a dead-band circuit.